United States Patent [19]

Birkeland et al.

[11] Patent Number: 5,119,610
[45] Date of Patent: Jun. 9, 1992

[54] WALL PANELING SYSTEM

[76] Inventors: Kirsten Birkeland; Osvald Birkeland, both of Calle Pringado No. 25, ES-38510 Barranco Hondo de Candelaria Tenerife, Islas Canarias, Spain

[21] Appl. No.: 623,751
[22] PCT Filed: Jun. 14, 1989
[86] PCT No.: PCT/NO89/00058
§ 371 Date: Feb. 8, 1991
§ 102(e) Date: Feb. 8, 1991
[87] PCT Pub. No.: WO89/12412
PCT Pub. Date: Dec. 28, 1989

[30] Foreign Application Priority Data

Jun. 17, 1988 [NO] Norway ................... 882685

[51] Int. Cl.⁵ .................................. E04C 2/00
[52] U.S. Cl. ........................... 52/241; 52/227; 52/595
[58] Field of Search ............... 52/227, 241, 233, 763, 52/36

[56] References Cited

U.S. PATENT DOCUMENTS

| 2,472,756 | 6/1949 | Nelsson | 52/241 |
| 4,741,135 | 5/1988 | Baeha | 52/227 |
| 4,850,170 | 7/1989 | Douglas et al. | 52/227 |

FOREIGN PATENT DOCUMENTS

| 1226757 | 10/1966 | Fed. Rep. of Germany . |
| 2047844 | 3/1971 | France . |
| 2599952 | 12/1987 | France . |
| 0119374 | 8/1970 | Norway . |
| 0132919 | 10/1975 | Norway . |
| 0136389 | 5/1977 | Norway . |
| 0157366 | 11/1987 | Norway . |
| 0142394 | 10/1953 | Sweden . |
| 0449822 | 5/1987 | Sweden . |
| 0589436 | 7/1977 | Switzerland . |

*Primary Examiner*—David A. Scherbel
*Assistant Examiner*—Wynn E. Wood
*Attorney, Agent, or Firm*—Kenyon & Kenyon

[57] ABSTRACT

The wall paneling system is constructed of a plurality of vertically disposed wall panels and vertical posts to which the panels are interconnected via a mortise and tenon connection. At least some of the panels are provided with vertical and horizontal rows of holes for receiving support hooks of pieces of furniture which are to be supported on the wall panels. In one embodiment, pairs of wall panels are connected between vertical posts with horizontal cross pieces disposed between the wall panels and extending from post to post. The cross pieces are secured to the post by tensioning elements. In another embodiment, a single wall panel is disposed between two posts with angle members being used to secure the panels to the respective posts.

10 Claims, 4 Drawing Sheets

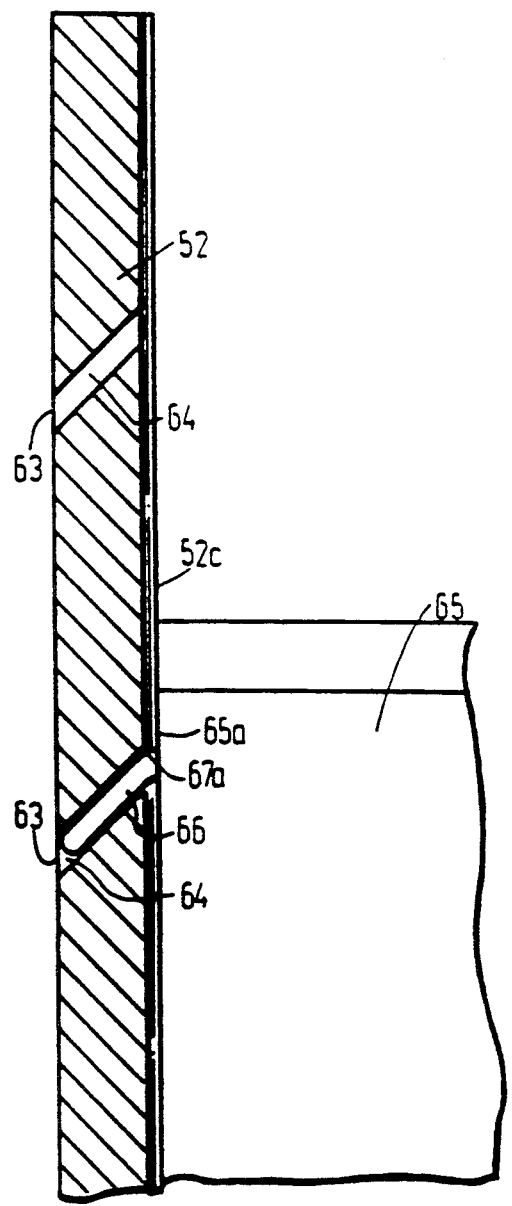
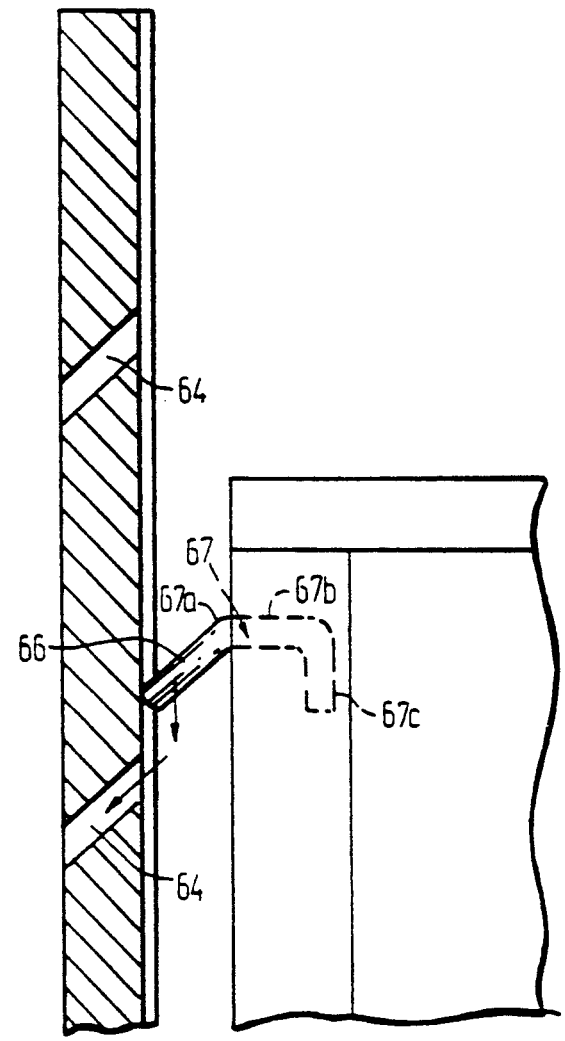
FIG. 11
FIG. 12

WALL PANELING SYSTEM

The present invention relates to an interior fittings system for the support of shelves, cabinets and other objects in connection with a wall, where each individual object is supported separately relative to the wall by means of support pins or support hooks directed obliquely outwards and downwards from the rear side of the object via equivalent fastening holes designed in load-absorbing support means.

A constructional shelving is known from NO Patent Specification 119,374 consisting of support means in the form of vertical support bars arranged along a wall or in a stand which are provided with their respective row or rows of fastening holes extending obliquely downwards for receiving corresponding support pins or support hooks extending obliquely downwards for furniture components, such as cabinets and shelves. Constructional shelving of this type makes it possible in a specific module system to fasten furniture components, such as cabinets and shelves, in rows above each other at different height levels relative to each other. The constructional shelving can form a wall section piece of furniture having certain possibilities for adjusting the furniture components to different height positions relative to each other, but on the other hand limited to the use of a uniform length for each furniture component which are carried in rows above each other. The constructional shelving can be erected with two or more wall sections arranged in rows consisting of rows of furniture components arranged vertically above each other fastened to their respective pairs of support bars The support bar must either be screwed securely directly to the wall or screwed securely to a furniture component which rests against a floor base. The known constructional shelving has a rather restricted possibility for use, since it mainly finds application as office furniture or house furniture and then with the shelving fastened directly to a wall or to a more or less independent stand. In addition the known constructional shelving only has the possibility of being able to be used in a rather restricted system with furniture components arranged relatively compactly and vertically in rows in addition to the furniture components as mentioned having a longitudinal dimension which is limited to the distance between the support bars.

With the present invention the aim is a far more flexible interior fittings system. The objective is to use fastening holes in a specific module system distributed over a large wall surface instead of the hitherto known restriction to fastening holes which are distributed in rows along vertical support bars. In this connection the aim is to be able to use furniture components, such as cabinets and shelves together with other arbitrary objects, such as paintings and other pictures, flower displays and the like with many mutually different breadth dimensions within the specific module system. More specifically the aim is to be able to place such objects having different and including arbitrary breadth dimensions within the specific module system and according to desire and need in different vertical and horizontal positions relative to each other along the surface of the wall. In other words the aim is to be able to utilise objects which are adapted to a specific module system in a far more flexible manner, that is to say in a less strict design, and thereby with the possibility for large variation along the wall surface. The aim is to be able to arrange the objects for example precisely in vertically and horizontally aligned rows or in arbitrarily horizontal and vertical positions relative to each other and having arbitrary distances both vertically and horizontally relative to each other.

This is achieved according to the invention in that each support element is formed by a relatively thick-walled plate of wood or similar rigid, wall facing-forming material and a pair of associated plate-bracing posts, that the plate and associated posts are provided with a cooperating mortice and tenon together with extra locking means for local locking together of plate and posts in a mortice and tenon engagement with each other, that fastening holes, which are designed in a manner known per se in vertical and horizontal rows in the plate and extend obliquely inwards and downwards relative to the main plane of the plate, are arranged in a specific module system (a, b) in the plate.

By means of the proposed interior fittings system a wall surface can be formed with vertical and horizontal rows of fastening holes in a specific module system, where different objects can be fastened in place as desired in one and the same plate or in two or more mutually impacting plates, if necessary during overlapping of the joint between the plates.

The interior fittings system is furthermore characterised in that each wall section comprises said plate and a framework, preferably of wood, consisting of a pair of post members, which form edge terminations on two opposite vertical side edges of the plate, and a spacing means extending transversely between the posts or a pair of spacing means extending transversely between the posts, each plate along its vertically extending sides being adapted to be introduced into a laterally directed support groove in each post member, with the front side of the post member flush with the front side of the plate, while each of the post members of the plate are fixable to the associated plate via the spacing element or the spacing elements which extend tightly against the plate on the rear side of the plate, together with cooperating locking means in the spacing element and the posts for fixing the posts with a gripping action against their intermediate plate and simultaneously with bracing of the plate in a vertical direction.

By means of the interior fittings system according to the invention one can erect an independent wall surface construction just by an existing wall or a totally independent, separate wall construction, as required. In other words one can erect the wall surface or the wall separately of one or more wall sections, wholly or partially independent of the wall constructions in the space where the wall sections are to be put up. In the independent wall construction or wall surface construction of the interior fittings system the transfer of the weight load can be permitted from the objects in the wall section directly to the floor base, since one can allow the plate of the wall section to rest directly against the floor base, while the plate is supported and braced in a vertical direction via the adjacent posts.

Furthermore, it is preferred that the spacing elements are fixedly connected to the plate at least point by point in the longitudinal direction of the spacing element and preferably over substantial surface areas of each spacing element surface, which faces towards the plate, with bracing of the plate in a horizontal direction, the spacing elements preferably being arranged in an intermediate space between two horizontal rows of fastening holes in the plate.

It is possible to fasten the spacing element or the spacing elements directly to the plate if desired in a permanent connection with this in order to facilitate the mounting of plate and posts, but also in order to ensure an effective bracing of the plate in the horizontal dimension, that is to say in the region between the posts.

In this way there is achieved an effective supporting and bracing of the plate in a horizontal direction also, without the fastening pins or the fastening hooks for the various objects needing to come into conflict with the spacing elements.

An especially favourable solution is achieved in that the posts or at least certain of the posts are provided with a pair of lateral oppositely directed support grooves for longitudinal bracing of each side edge of the plate, said posts forming connecting means between each pair of plates in two associated neighbouring wall sections, while at least locking means of certain of the posts form common locking means for cooperating locking means in a pair of spacing elements in the pair of the neighbouring wall sections.

According to the invention it is possible to set up the wall section(s) just by a permanent wall construction without having to connect the wall section(s) directly to the wall construction or to the adjacent ceiling, and to set up an independent wall construction of such wall sections without having to connect the wall section(s) with an adjacent ceiling, in that an object, such as a cabinet supported on a floor base, which is fastened to the plate via associated support hooks and possible additional fastening means which are fastenable to the fastening holes in the plate, forms floor support means for the associated wall section, the object in the horizontal space from the wall being provided with regulating means for adjusting the vertical position of the object and thereby the vertical position of the wall section relative to the floor.

In this way one can place the wall section up against a wall construction and allow the wall section to be pressed inwardly against the upper end of the wall construction by exerting a tensional force between the cabinet and the floor via regulating means at the forward, lower portion of the cabinet, without the regulating means needing to be especially visible after mounting and without the remaining fastening means needing to be shown on the wall section itself.

Alternatively the wall section can be fastened in place on a wall construction standing behind by means of fastening means which are anchored in the wall construction for example via fastening means which pass through certain fastening holes of the wall section.

In instances where the wall section is to be employed in connection with a space partition, for example in the form of an independent whole wall or an independent half wall (wall which is terminated at a significant distance from the ceiling), the invention is characterised in that the posts on the vertical side edge or on each of its vertical side edges are provided with a first support groove for the support of a first fastening hole-carrying plate flush with its one main side surface and with a second support groove for the support of a second plate, preferably a second fastening hole-carrying plate, flush with its opposite main side surface, to form an independent double-sided wall section.

In other words a wall surface construction or a wall construction can be employed where certain of the plates are provided with fastening holes, for example the plates on the one side in an independent wall construction, while the remainder of the plates, for example the plates on the other side in the independent wall construction are without such fastening holes.

In the intermediate space between the said first and second plate and the associated spacing elements of each plate there can be defined if necessary an intermediate space for the reception of insulation material. If desired the wall section can be erected at the location of use by means of plates with the spacing elements fastened to these at the fabrication location, with filling by insulation material and subsequent shutting off of the intermediate space by means of the posts and possible cover strip along the top and/or along the bottom of the wall section.

Alternatively the first and the second plate from the production location can be rigidly connected to each other via a common set of spacing elements, with if desired insulation material mounted in place between the plates.

Obviously it will also be possible to erect plates, spacing elements, posts and if necessary insulation material directly at the location of use.

Further features of the invention will be evident from the following description having regard to the accompanying drawings in which:

FIG. 11 and 12 show in part in side view and in part in vertical section a cabinet section and a plate in two different phases of a fastening together of these.

Figure 1:
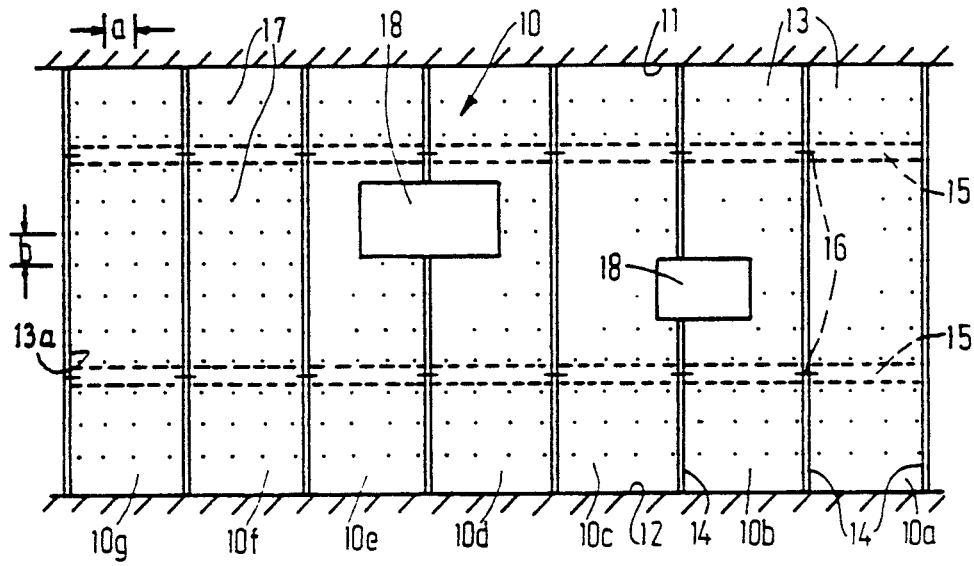
FIG. 1 shows in vertical elevation the interior fittings system according to the invention in the form of a whole wall construction.

With reference to FIG. 1 there is shown an interior fittings system comprising a wall construction 10 of whole wall construction, where the wall extends continuously from ceiling 11 to floor 12. The wall construction 10 is constructed of a number (seven shown herein) of wall sections 10a–10g which each comprise a wall plate 13 which is connected to a framework 14, 15 and associated connecting means 16. The framework consists of vertical posts 14 which are arranged along the respective vertical side edge of the associated wall plate 13 and horizontal cross-pieces 15 (shown in broken lines in FIG. 1) which are arranged on the rear side of the wall plate 13. The two cross-pieces 15, which are arranged at an upper and at a lower portion of the wall plate, are connected at opposite ends endways with the adjacent posts 14 which project a distance behind the wall plates 13. The connecting means 15 and the posts 14 are preferably common to two neighbouring wall sections, as will be described further below. That is, the framework 14, 15 and wall plates 13 are shown in detail in FIG. 3.

Each plate 13 is provided with horizontal and vertical rows of fastening holes 17 which extend from the front side obliquely downwards and inwards through the plate 13. There is illustrated a module system of fastening holes having a horizontal distance a and a vertical distance b. In the illustrated embodiment, the distance a is equal to the distance b, but these distances can if desired be differing in practice. The holes are designed so that, relative to the posts, the distance a constitutes a fraction of the breadth of each wall section and the whole wall construction. The distance a and/or b can have a length of for example 5, 10 or 15 cm.

In the illustrated embodiment all plates 13 are provided with fastening holes 17, but in practice there can be employed in the same system certain plates with fastening holes and the remaining plate without fastening holes, where this must be preferred.

Figure 7:
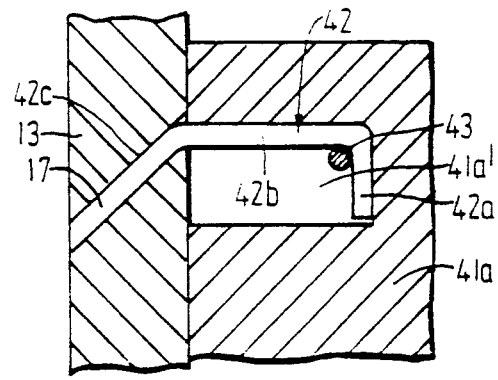
FIG. 7 shows in part a vertical section of a wall plate and a part of a piece of furniture which can be suspended on the wall plate.

In FIG. 1 there are shown purely for the purposes of illustration two pieces of furniture, for example two cabinets 18, which are suspended in a manner known per se by means of the respective pairs of pins directed obliquely downwards and outwards (correspondingly as shown in FIG. 7) which are received in the respective holes in the wall construction. Two cabinets 18 are shown, which are fastened at each end to each of two mutually adjacent wall sections 10f respectively, and illustrated in their respective height positions on the wall construction. Such pieces of furniture or other objects of current interest can be fastened at arbitrary locations on the wall construction as desired and required. Provision is made for support pins of the pieces of furniture to be fastened in a corresponding module system as the distances a for the module system of the fastening holes. In instances where both upper and lower support pins are employed on the piece of furniture which is to be fastened on the wall construction, one obviously chooses the same module system for the vertical distance between the support pins as the module system for the distance b for the fastening holes.

Figure 2:
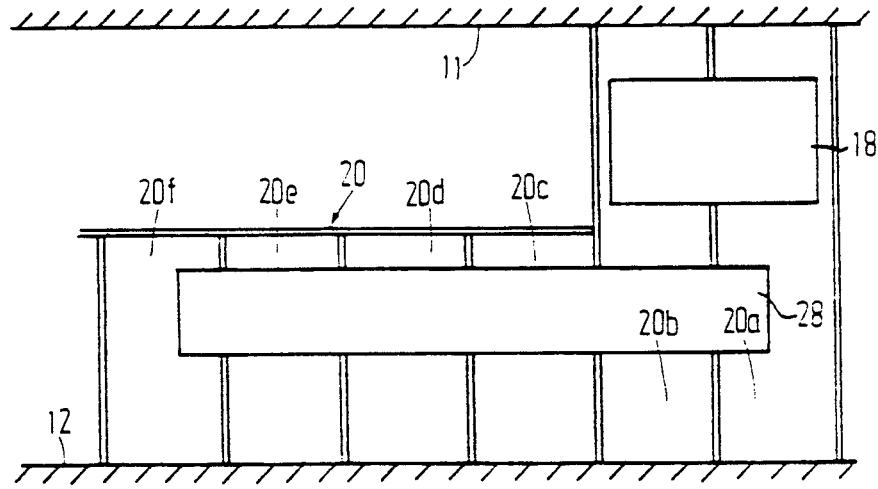
FIG. 2 shows in vertical elevation the interior fittings system according to the invention in the form of a combined whole and half wall construction.

In FIG. 2 there is illustrated an alternative wall construction 20, that is to say a combined whole and half wall construction. In the illustrated embodiment, the wall construction consists of two wall sections 20a, 20b corresponding to the wall sections in the wall construction 10 together with four wall sections 20c-20f having a corresponding design as, but with a somewhat smaller height than the wall sections in the wall construction 10.

Alternatively the whole wall construction can be made as a half wall construction (not shown further).

In FIG. 2 there is shown purely for the purposes of illustration an elongate furniture construction 28 which spans over all the wall sections 20a-20f together with a piece of furniture 18 which spans over two of the wall sections, that is to say the wall sections 20a and 20b.

In the afore-described embodiments, the wall construction consists of a wall which is adapted to support itself against or to be fastened as a wall facing for an existing wall or existing construction of timber placed endways. Instead of the illustrated construction having wall plates which are fastened to each other via a framework, there can be employed if desired single wall plates which are without framework and which are jointed together end-to-end with a mortice and tenon connection similarly as conventional wall panel plates or ceiling panel plates. Such single wall plates can for example be fastened to an endways-disposed timber construction or to another suitable base with fastening means which are received in the fastening holes in the wall plate.

Figure 3:
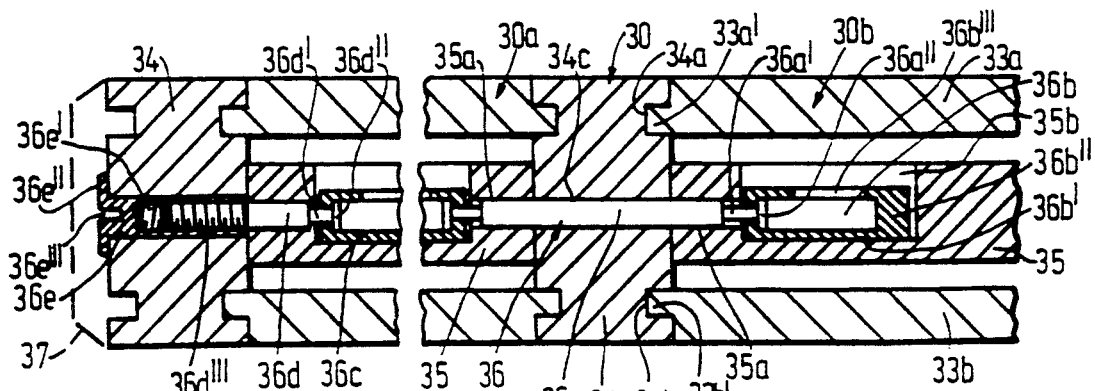
FIG. 3 shows in part a horizontal section of a wall construction according to the invention.
Figure 4:
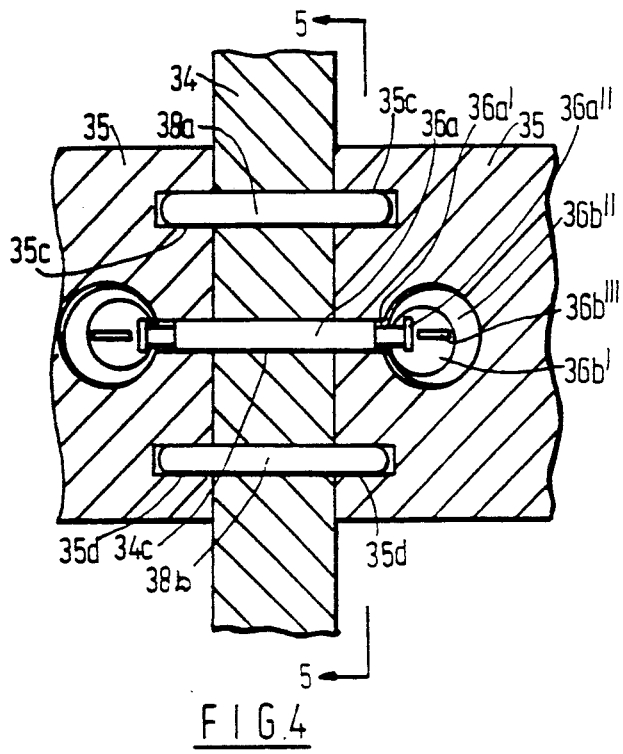
FIG. 4 shows in part a vertical section of a wall construction according to the invention.
Figure 5:
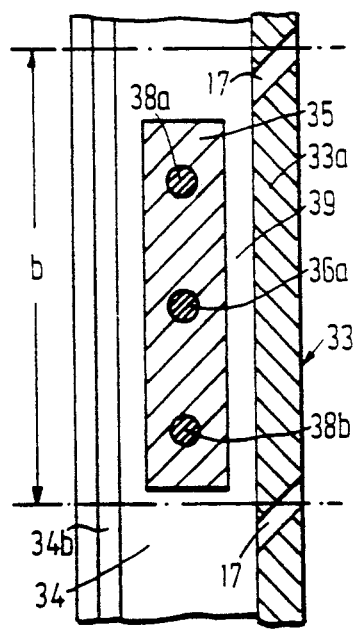
FIG. 5 shows a section along the line 5—5 in FIG. 4.

In FIG. 3-5 there is shown a further construction where the wall construction 30 is intentionally used as an independent partition wall. Such a partition wall can for example be designed with a construction similarly as shown in FIG. 1 or 2. There is shown part of two wall sections 30a and 30b which are connected to each other via a common post 34 and a common connecting means 36. There are illustrated a pair of first wall plates 33a on one side of the wall and a pair of second wall plates 33b on the other side of the wall. In FIG. 5 there is only shown the one wall plate 33a on one side of the wall and the wall section can be used if desired in such a condition, without functional problems. The wall plates 33a and 33b are each provided with their respective flange portion 33a, and 33b' which are each received in their respective groove 34a, 34b in the posts 34, so that the outer surface of the wall plate is precisely flush with the adjacent outer surface of the post. The wall plates 33a and 33b are clamped in place between their two associated posts 34 by means of the common connecting means 36 which is in the form of a regulatable tensioning means 36a, 36b and 36c, 36d and 36e respectively and horizontally extending cross-pieces 35.

A first group of tensioning means consists of a pin-shaped means 36a with locking groove 36a' and locking head 36a" in each of its two ends. The tensioning means 36a is adapted to pass with a close fit through a bore 34c which extends transversely through the post 34. The pin-shaped means 36a is adapted to be threaded endways inwardly into an associated endways opening bore 35a in each of two cross-pieces 35 which contact against the common post 34. The bore 35a opens out into a laterally opening cavity 35b in each associated cross-piece. In the cavity there is designed an eccentric lock 36b in the form of a circular disc 36b' (see FIG. 4) having an associated eccentric cam 36b" which is adapted to engage in the groove 36a' just behind the head 36a" on the pin-shaped means 36a and by turning the eccentric lock in the cavity—for example by introducing a screw driver in a groove 36b"'—one can tension in advance the one cross-piece 35 against one side of the post 34, while thereafter one tensions in a similar manner the second cross-piece 35 against the opposite side of the post 34 and thereby connects these with a common tensional force via common pin shaped means 36a to the common post 34.

At one end of the wall construction there is only employed one side of the post 34 for fastening the wall plates 33a and 33b. In this case, there is employed a second group of pin-shaped means, comprising an eccentric lock 36c corresponding to the eccentric lock 36b for engagement with a tensioning means 36d having locking groove 36d', and locking head 36" in only the one end. In the opposite end means 36d is provided with external threads 36'" which cooperate with equivalent internal grooves 36e' in a further 36e" to the tensioning means 36d, 36e is formed of a pin-shaped means 364 and a threaded sleeve 36e. The pin-shaped means 36d has a head 36d" at one end for cooperating with an eccentric lock 36c, as above and a threaded opposite end with external threads to cooperate with the threaded sleeve 36e which is rotatably mounted in the post 34 means in the form of a regulating sleeve 36e. The sleeve 36e is provided with a head 36e" having an associated screw driver groove 36e"'. By regulating the sleeve 36e the cross-piece 35 can be fixed to the end post 34. Finally, the end post can for example be covered with a cover strip 37 (shown in broken lines in FIG. 3).

As shown in FIG. 4 and 5 there are employed outside the pin shaped means 36a two guide pins 38a and 38b, one on each side of the tensioning means 36a. The guide pins 38a, 38b pass through respective bores in the post 34 and project inwardly into their respective bores 35c and 35d in the adjacent cross-pieces 35. In FIG. 5 there is shown a gap 39 between the cross-piece 35 and the plate 13 and such a gap 39 can if desired receive insulation material, where this is desirable. Alternatively the cross-piece 35 can push tightly up to the plate 13 and if desired be rigidly connected with this.

In FIG. 5 there are shown two fastening holes 17 arranged over each other, extending obliquely downwards which have a mutual distance corresponding to the distance b as mentioned above. In the illustrated embodiment the cross-piece 35 is provided with a height dimension which is somewhat less than the distance b, so that the crosspiece does not need to come into conflict with support hooks or support pins fastened to objects which are to be suspended on the plate 13.

Figure 6:
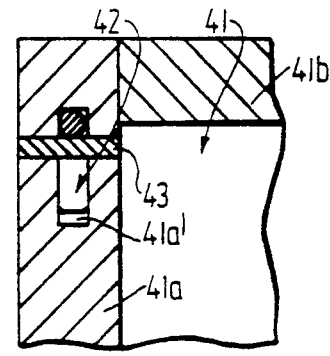
FIG. 6 shows in part a vertical section of the one corner of a piece of furniture which can be suspended on the wall construction.

In FIG. 6 and 7 there is shown part of a corner of a piece of furniture (for example a cabinet, a shelf or the like) 41 which is to be suspended on the plate 13. The piece of furniture 41 is provided with a vertical side member 41a and a horizontal top member 41b. In the rear side surface of the side member a cavity 41a' is formed for the reception of a support hook 42 which is secured in place in the cavity 41a' with a fastening nail 43. The support hook 42 has a vertically extending inner leg 42a which forms a support against the end surface of the cavity 41a' and a horizontally extending web portion 42b angled from the inner leg which forms a support against one, upper side surface of the cavity From the opposite end of the web portion an outer leg 42c which forms the support pin of the support hook projects outwardly from the cavity 41a' and obliquely downwards. The piece of furniture as shown in part in FIG. 6 and 7 has a support hook at each of the opposite upper corners of the piece of furniture and on mounting the piece of furniture on the plate 13, support pins of the support hooks 42 are inserted in their respective associated fastening holes 17 in the plate 13 and secure the piece of furniture in a self-locking manner in an effective fastening on the plate 13, the lower portion of the piece of furniture forming for example a supporting abutment directly against the plate or if desired resting against a floor base.

Figure 8:
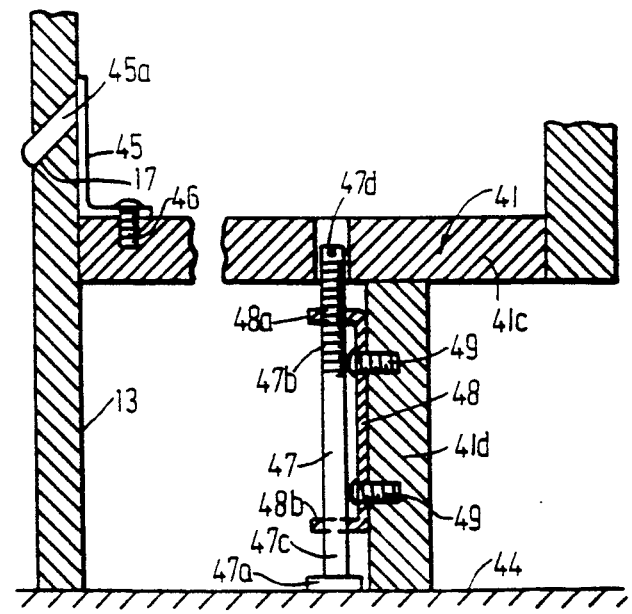
FIG. 8 shows in part a vertical section of a piece of furniture which in part can be suspended on the wall construction and in part supported against the base.

In FIG. 8 there is shown the lower portion of a piece of furniture 41 which rests against a floor base 44 via a forward support board 41d which supports a base plate 41c in the piece of furniture. In this case an angle member 45 is fastened with an associated support pin 45a in a fastening hole 17 in the plate 13 and preferably an angle member 45 with associated support pin 45a at each end of the piece of furniture. After the piece of furniture is mounted in place the angle member 45 is fastened with a fastening screw 46 to the base plate 41c. By this the piece of furniture 41 is fastened at four points (two upper points similarly as shown in FIG. 6 and 7 and two lower points similarly as shown in FIG. 8) relative to the plate 13. By means of the piece of furniture 41, an independent wall can be supported via associated plate 13.

In FIG. 8 there is shown a regulating mechanism for adjusting the position of the piece of furniture and thereby the position of the adjacent wall relative to the vertical plane. A support leg 47 is shown which forms a support against the floor base 44 with a support foot 47a. At the opposite end the support leg 47 is provided with a screw threaded portion 47b which engages with a screw threaded bore in an upper leg 48a of a fastening angle 48 while the non-threaded lower portion 47c of the support leg engages with a non-threaded bore in a lower leg 48b of the fastening angle 48. The fastening angle is screwed fast with screws 49 to the rear side of the support board 41d. In the uppermost end of the support leg, there is formed a groove 47d for the reception of a screw driver (not shown) for regulating the distance of the support board above the floor base 44.

In the illustrated embodiments there is not shown a special fastening of the wall sections to floor or ceiling, but it is apparent that this can be effected where this is desirable. In addition or instead the wall section can be fastened in place with associated (not shown) ceiling strips and floor strips which cover the joint between wall section and ceiling and floor, where this is desirable.

Figure 9:
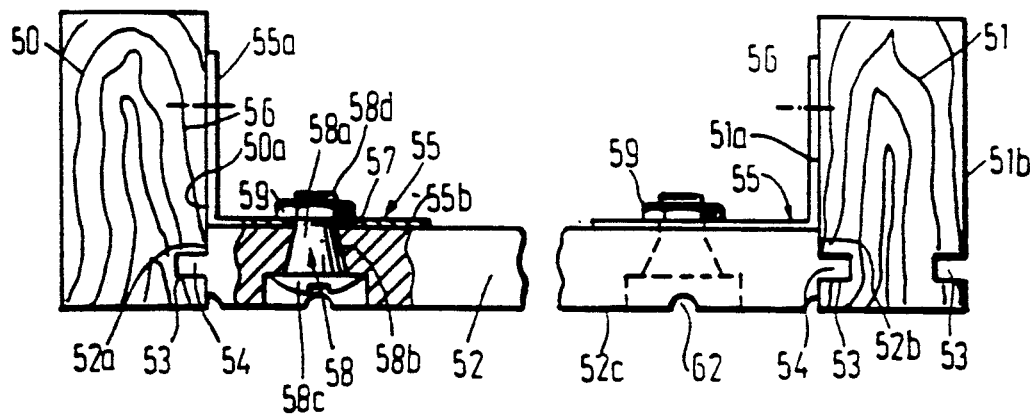
FIG. 9 shows in a plan representation and in part an alternative construction of a plate having associated posts according to the invention.

In FIG. 9 there is illustrated the one of a number of cooperating wall sections. Each wall section comprises two posts 50, 51 and an intermediate plate 52, certain of the posts (the post 51 in the present case) being a common post for two neighbouring sections. Each post is provided in its one side surface 50a and 51a with a vertically extending mortice 53 which cooperates with a corresponding tenon 54 along a corresponding vertical side edge 52a and 52b respectively of the plate 52. In the one post 51 there is shown a corresponding mortice 53 in each of its opposite side surfaces 51a and 51b, but in cases where two included wall sections shall impact in an acute or obtuse angle with each other there can be formed such a mortice in a pair of included side surfaces instead of in a pair of opposite side surfaces.

Figure 10:
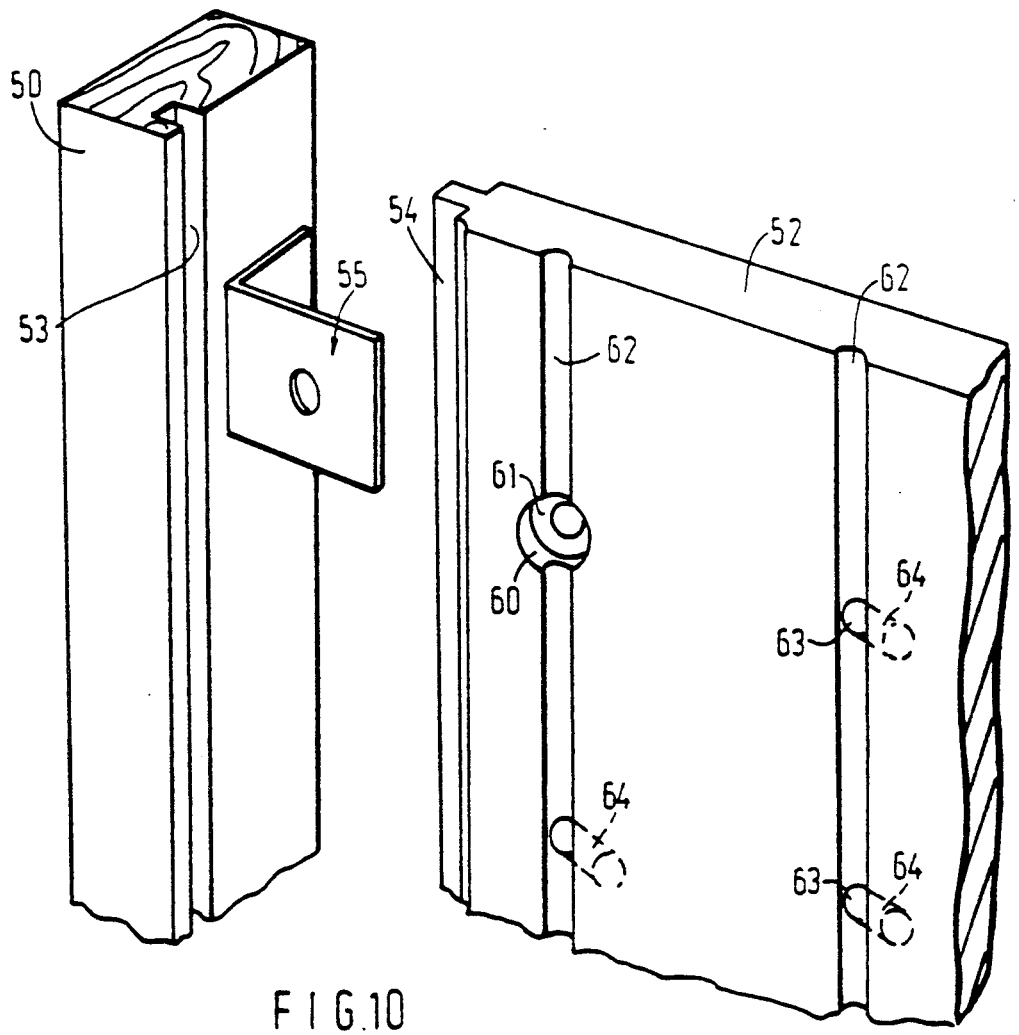
FIG. 10 shows in perspective and in part the plate and an associated post made ready for mutual jointing together.

As shown in FIG. 9 and 10 each post is provided with an L-shaped fastening fitting 55. One leg 55a of the fitting is fastened to the post with its respective pair of fastening screws (only the one is shown in FIG. 9) as indicated by the chain line 56. The second leg 55b is provided with a fastening hole 57 for the reception of a guide portion 58a of a fastening screw 58. On the one side of the guide portion 58a there is shown a conical neck portion 58b which is terminated with a screw head 58c, while on the other side of the guide portion 58a there is shown a thread-carrying portion 58d for the reception of a fastening nut 59. As shown in FIG. 9 head 58c of the fastening screw 58 is received in a cavity 60 laterally within the front side 52c of the plate 52, while the conical neck portion 58b of the fastening screw is received in an equivalent conical cavity 61. By means of the conical surfaces of the neck portion 58b and the cavity 61 one can ensure that the mortice and tenon engagement between post and plate is guaranteed in a precise position relative to each other by a corresponding pushing movement of the tenon laterally inwards into the mortice.

In FIG. 10 there is shown a post and a plate made ready for pushing together via the mortice and tenon connection together with the locking together of the post and plate via fastening fitting, fastening screw and fastening nut. In practice there will normally be employed an upper and a lower fastening fitting between each post and each associated plate in order to ensure accurate engagement between post and plate.

The plate is provided with a row of vertically extending grooves 62 which separately extend in alignment with an associated vertical row 63 of fastening holes 64 which pass through the plate in a direction obliquely downwards and inwards relative to the front side 52c. More specifically the fastening holes 64 extend from the bottom of the groove 62 to the back side of the plate and stretch for example over approximately ¾ of the thickness of the plate 52.

By means of the grooves 62 there is achieved firstly a favourable design effect in the plate 52, so that the impression of the holes in the plate becomes somewhat dimmed and becomes concentrated to the grooves. Secondly there is obtained the advantage that the grooves can form guide grooves during the insertion of support pins 66 of a cabinet section 65 or similar furniture section on associated support hooks 67 in associated fastening holes 63 in the plate 52. Such a guiding is further indicated in FIG. 11 and 12.

As shown in FIG. 11 the support pin 66 on an associated support hook 67 is rounded off in a transition portion 67a between the support pin 66 and remaining portions 67b, 67c of the support hook 67. When the illustrated grooves 62 are employed in the plate 52 the transition portion 67a can be received in the groove 62 without the transition portion 67a needing to act on the outer edge portion of the fastening holes. In other words by means of the groove 62 an effective supporting abutment can be ensured between support pin 66 and the material which surrounds the fastening hole. In addition one can counteract the support pin preventing a level supporting abutment between the front side 52c of the plate 52 and the rear side 65a of the cabinet section 65. By this there is ensured an effective supporting abutment face-to-face between plate and cabinet section with mutual support and bracing between plate and cabinet section in the fixing region between support pins of the cabinet section.

We claim:

1. A wall paneling system comprising
   at least one vertically disposed wall panel having a plurality of vertical and horizontal rows of holes therein, at least some of said holes extending obliquely downwards and inward through said panel;
   a pair of vertically disposed posts, each post being disposed along a respective vertical edge of said wall panel;
   a cooperating mortise and tenon connection between each post and a respective vertical edge of said wall panel;
   locking means securing each post to said wall panel; and said locking means including a horizontal cross-piece extending in parallel between said panels form one of said posts to the other of said posts, and a pair of regulatable tensioning means, each of said tensioning means securing one end of said cross-piece to a respective post.

2. A wall paneling system as set forth in claim 1 which comprises a second wall panel extending between said posts in parallel relation to said one wall panel.

3. A wall paneling system as set forth in claim 1 wherein one of said tensioning means includes a pin-shaped means extending through a respective post and an eccentric lock rotatably mounted in a respective end of said cross-piece in engagement with one end of said pin-shaped means.

4. A wall paneling system as set forth in claim 3 wherein said pin-shaped means has a threaded end opposite said eccentric lock and said tensioning means further includes a threaded sleeve rotatably mounted in said respective post and threadably receiving said threaded end of said pin-shaped means.

5. A wall paneling system as set forth in claim 1 further comprising a piece of furniture mounted on said wall panel, said piece of furniture having a plurality of support hooks extending therefrom into respective holes in said wall panel.

6. A wall paneling system as set forth in claim 5 wherein said piece of furniture has a support board for resting on a floor base.

7. A wall paneling system as set forth in claim 1 wherein said wall panel has a plurality of vertical grooves in a face thereof aligned with vertical rows of said holes.

8. A wall paneling system comprising
   at least a pair of vertically disposed parallel wall panels, at least one panel having a plurality of horizontal and vertical rows of holes therein;
   a pair of vertically disposed posts, each post being disposed along respective vertical edges of said wall panels;
   a mortise and tenon connection between each post and said wall panels;
   at least one horizontal cross-piece disposed between said wall panels and extending from one of said posts to the other of said posts; and
   regulatable tensioning means securing each respective end of said cross-piece to a respective post for locking said respective post with said wall panels.

9. A wall paneling system as set forth in claim 8 further comprising a piece of furniture mounted on said wall panel, said piece of furniture having a plurality of support hooks extending therefrom into respective holes in said wall panel.

10. A wall paneling system as set forth in claim 8 wherein said one wall panel has a plurality of vertical grooves in a face thereof aligned with vertical rows of said holes.

* * * * *